United States Patent
Gallier

(10) Patent No.: US 10,801,724 B2
(45) Date of Patent: Oct. 13, 2020

(54) METHOD AND APPARATUS FOR MINIMIZING CROSS-FLOW ACROSS AN ENGINE COOLING HOLE

(71) Applicant: General Electric Company, Schenectady, NY (US)

(72) Inventor: Kirk D. Gallier, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 162 days.

(21) Appl. No.: 15/622,730

(22) Filed: Jun. 14, 2017

(65) Prior Publication Data
US 2018/0363901 A1    Dec. 20, 2018

(51) Int. Cl.
   *F23R 3/00*    (2006.01)
   *F02C 7/18*    (2006.01)
   *F01D 5/18*    (2006.01)

(52) U.S. Cl.
   CPC .............. *F23R 3/002* (2013.01); *F01D 5/187* (2013.01); *F02C 7/18* (2013.01); *F05D 2260/201* (2013.01); *F05D 2260/202* (2013.01); *F05D 2260/221* (2013.01); *F05D 2260/607* (2013.01); *F23R 2900/03042* (2013.01); *F23R 2900/03044* (2013.01)

(58) Field of Classification Search
   CPC ............ F23R 3/002; F23R 2900/03042; F23R 2900/03044; F02C 7/18; F05D 2260/201
   See application file for complete search history.

(56) References Cited

U.S. PATENT DOCUMENTS

| | | | | |
|---|---|---|---|---|
| 3,628,885 A | * | 12/1971 | Sidenstick | F01D 5/189 416/217 |
| 4,330,235 A | * | 5/1982 | Araki | F01D 5/185 416/96 R |
| 4,820,122 A | * | 4/1989 | Hall | F01D 5/187 416/92 |
| 5,142,859 A | * | 9/1992 | Glezer | F01D 5/082 415/115 |
| 5,700,131 A | * | 12/1997 | Hall | F01D 5/187 416/97 R |
| 5,738,493 A | * | 4/1998 | Lee | F01D 5/187 416/97 R |
| 5,797,726 A | * | 8/1998 | Lee | F01D 5/187 416/96 R |
| 6,033,181 A | * | 3/2000 | Endres | F01D 5/187 416/96 A |
| 6,099,245 A | * | 8/2000 | Bunker | F01D 5/146 415/115 |

(Continued)

FOREIGN PATENT DOCUMENTS

EP         1111190 A1    6/2001

*Primary Examiner* — Phutthiwat Wongwian
*Assistant Examiner* — Sherman D Manley
(74) *Attorney, Agent, or Firm* — McGarry Bair PC

(57) ABSTRACT

An apparatus and method for minimizing a cross-flow across an engine cooling hole can include a component, such as an airfoil, having an outer wall bounding an interior from an exterior. A cooling passage is formed in the interior of the component for cooling the engine component. A cooling hole or film hole can be provided in the outer wall fluidly coupling the interior to the exterior. The cooling passage can be shaped to minimize cross-flow over the cooling hole at the interior of the component.

25 Claims, 6 Drawing Sheets

(56) References Cited

U.S. PATENT DOCUMENTS

| | | | |
|---|---|---|---|
| 6,406,260 B1 * | 6/2002 | Trindade | F01D 5/187 415/115 |
| 6,932,573 B2 * | 8/2005 | Liang | F01D 5/187 415/115 |
| 6,974,308 B2 * | 12/2005 | Halfmann | B22C 9/04 415/115 |
| 7,094,031 B2 * | 8/2006 | Lee | F01D 5/187 416/97 R |
| 7,195,448 B2 * | 3/2007 | Levine | F01D 5/187 415/115 |
| 7,347,671 B2 | 3/2008 | Dorling et al. | |
| 7,780,414 B1 * | 8/2010 | Liang | B22C 9/10 164/369 |
| 8,182,221 B1 * | 5/2012 | Liang | F01D 5/087 415/115 |
| 8,210,814 B2 * | 7/2012 | Zausner | F01D 5/187 416/97 R |
| 8,628,293 B2 * | 1/2014 | Ramachandran | F01D 5/186 415/115 |
| 8,695,683 B2 | 4/2014 | Albert et al. | |
| 9,091,495 B2 * | 7/2015 | Lee | F01D 5/187 |
| 9,376,919 B2 * | 6/2016 | Fujimoto | F01D 5/186 |
| 9,393,620 B2 * | 7/2016 | Bales | B22F 5/04 |
| 10,012,090 B2 * | 7/2018 | Slavens | F01D 5/187 |
| 2003/0108422 A1 * | 6/2003 | Merry | F01D 5/187 416/97 R |
| 2010/0074759 A1 * | 3/2010 | Dierksmeier | F01D 5/147 416/241 B |
| 2012/0201653 A1 * | 8/2012 | Moga | F01D 5/147 415/115 |
| 2016/0076384 A1 * | 3/2016 | Snyder | F01D 9/02 415/115 |
| 2016/0201487 A1 * | 7/2016 | Spangler | F01D 25/12 415/115 |
| 2016/0251966 A1 | 9/2016 | Bunker et al. | |
| 2018/0156042 A1 * | 6/2018 | Mongillo, Jr. | F01D 5/187 |

* cited by examiner

METHOD AND APPARATUS FOR MINIMIZING CROSS-FLOW ACROSS AN ENGINE COOLING HOLE

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines for aircraft are designed to operate at high temperatures to maximize engine efficiency, so cooling of certain engine components, such as the high-pressure turbine and the low-pressure turbine, can be beneficial. Typically, cooling is accomplished by ducting cooler air from the high and/or low-pressure compressors to the engine components that require cooling. Temperatures in the high-pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior cooling circuits for routing the cooling air through the blade to cool different portions of the blade, and can include dedicated cooling circuits for cooling different portions of the blade. The cooling circuits can include one or more airflow element to enhance the cooling, however, such elements can lead to excessive collection of dust or particulate matter reducing service life or requiring additional maintenance.

BRIEF DESCRIPTION OF THE INVENTION

In one aspect, the disclosure relates to an airfoil for a turbine engine comprising an outer wall having an outer surface and an inner surface bounding an interior, the outer wall defining a pressure side and a suction side extending axially between a leading edge and a trailing edge defining a chord-wise direction and extending radially between a root and a tip defining a span-wise direction. A cooling circuit is at least partially defining by a cooling passage located in the interior and defining a flow direction, having a passage cross-sectional area. At least one cooling hole extends through the outer wall having an inlet provided at the cooling passage and an outlet provided on the outer surface. The cross-sectional area of the cooling passage is sized to maintain a ratio of a speed of a flow through the cooling passage to a speed of a flow through the cooling hole to be less than 0.50.

In another aspect, the disclosure relates to a component for a turbine engine comprising an outer wall having an outer surface and an inner surface bounding an interior space. A cooling passage is located in the interior and adapted to provide a flow of fluid along a flow direction, and has a first wall and a second wall spaced form the first wall by a cross-sectional distance. At least one cooling hole extends through the outer wall and has an inlet provided at the first wall and an outlet provided on the outer surface. The first wall is spaced from the second wall to size the cross-sectional distance to maintain a ratio of a speed of a flow through the cooling passage to a speed of a flow through the cooling hole to be less than 0.50.

In yet another aspect, the disclosure relates to a method of minimizing cross-flow across a cooling hole exhausting a fluid from a cooling passage. The method comprises positioning a cooling hole in the cooling passage wherein a ratio of a flow speed through the cooling passage to a flow speed through the cooling hole to be less than 0.50.

DETAILED DESCRIPTION OF THE INVENTION

Figure 1:
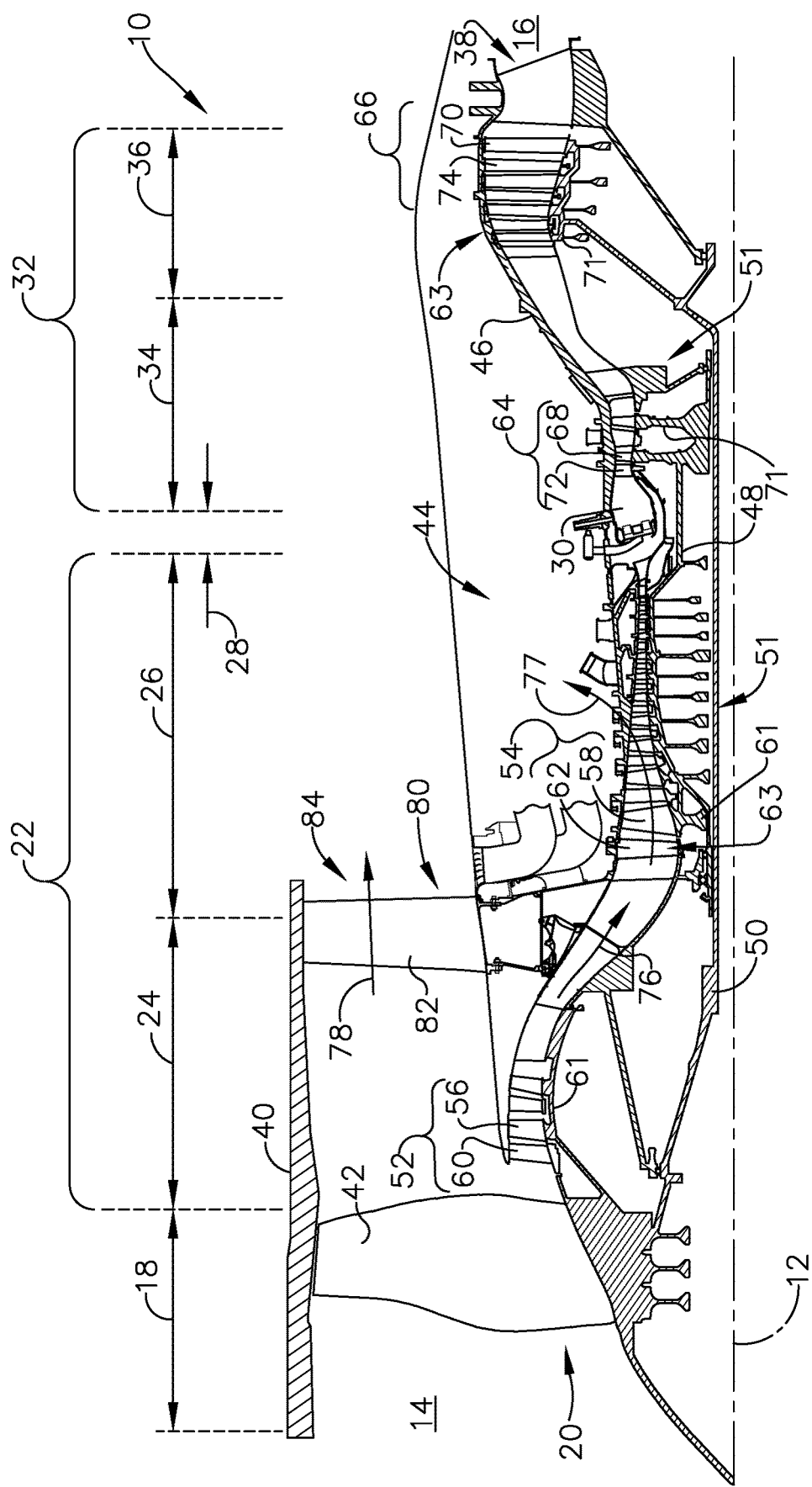
FIG. 1 is a schematic cross-sectional diagram of a gas turbine engine for an aircraft.

Aspects of the disclosure described herein are directed to a method and apparatus for minimizing a cross-flow passing across an inlet for a cooling hole such as a cooling hole or film hole. For purposes of illustration, the present disclosure will be described with respect to a blade for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications. Similarly, the aspects as described herein will have equal applicability to other engine components having film cooling and are not limited to airfoils or blades alone.

As used herein, the term "forward" or "upstream" refers to moving in a direction nearer to an origin of a flow of fluid relative to the direction of the local flow of fluid, such as air, or toward the engine inlet, or a component being relatively closer to the engine inlet as compared to another component. The term "aft" or "downstream" used in conjunction with "forward" or "upstream" refers to a direction further from an origin of a flow of fluid relative to the direction of the local flow of fluid, such as air, or toward the rear or outlet of the engine or being relatively closer to the engine outlet as compared to another component. Additionally, as used herein, the terms "radial" or "radially" refer to a dimension extending between a center longitudinal axis of the engine and an outer engine circumference. As used herein, the term "fluid" means any substance that can move or act in a fluidic manner, such as a liquid or gaseous substance, such as an airflow.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
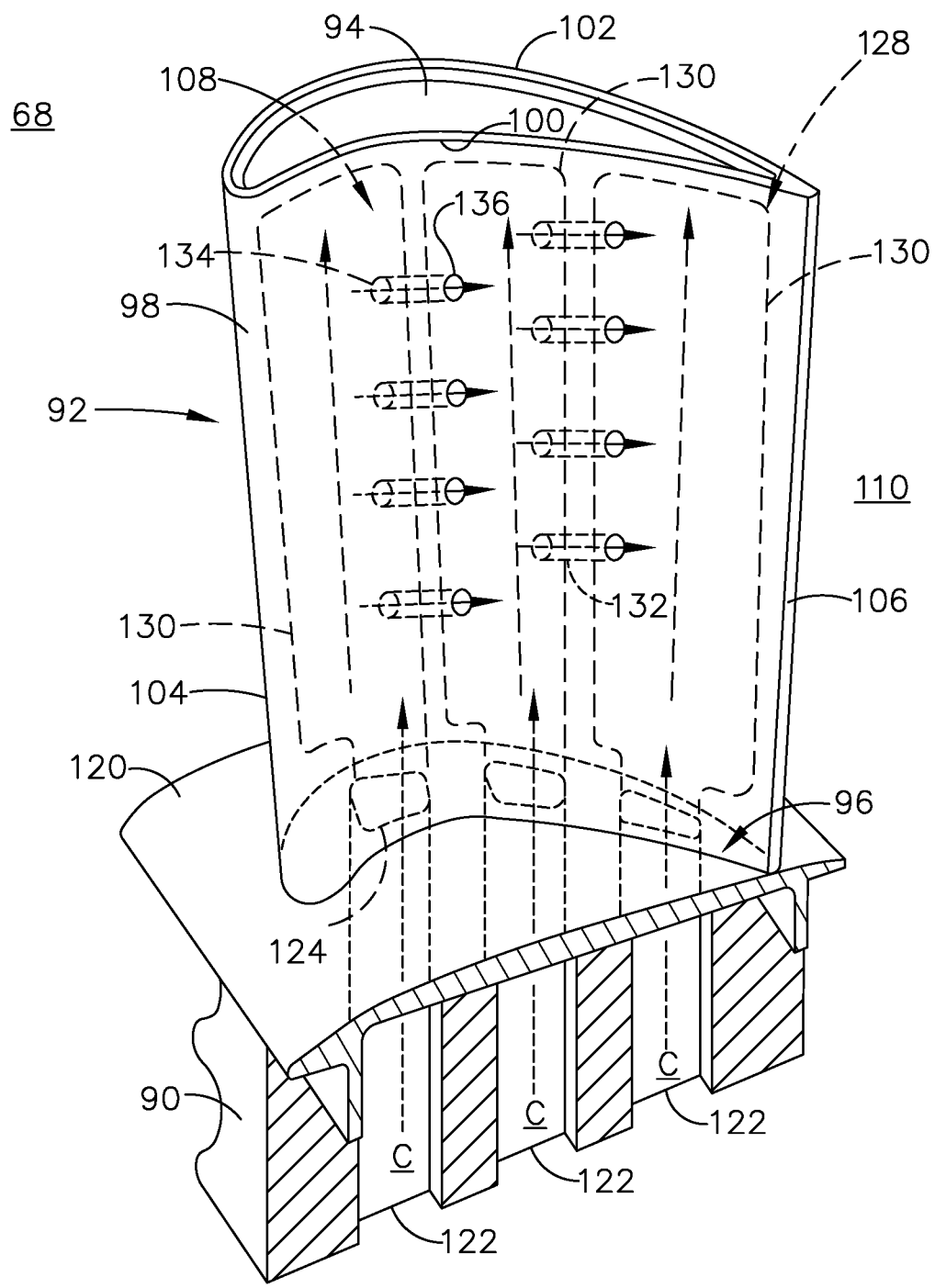
FIG. 2 is a perspective view of an airfoil of the gas turbine engine of FIG. 1 including interior cooling passages.

Referring now to FIG. 2, an engine component illustrated in the form of the turbine blade 68 includes a dovetail 90 and an airfoil 92. The airfoil 92 includes a tip 94 and a root 96 defining a span-wise direction therebetween. In the case of a stationary vane or nozzle, the tip 94 can be the furthest radial extent of the airfoil 92. The airfoil 92 further includes an outer wall 98, having an outer surface facing the exterior of the airfoil 92 and an inner surface facing the interior of the airfoil 92, and defining a pressure side 100 and a suction side 102 connected at a leading edge 104 and a trailing edge 106, defining a chord-wise direction therebetween. The outer wall 98 separates an interior 108 of the airfoil 92 from an exterior 110.

The airfoil 92 mounts to the dovetail 90 at a platform 120 at the root 96. The platform 120 helps to radially contain a turbine engine mainstream airflow driven by the blade 68. The dovetail 90 can be configured to mount to a turbine rotor disk 71 on the engine 10 of FIG. 1. The dovetail 90 further includes at least one inlet passage 122, shown as a three exemplary inlet passages 122, each extending through the dovetail 90 to provide internal fluid communication with the airfoil 92 at a passage outlet 124. It should be appreciated that the dovetail 90 is shown in cross-section, such that the inlet passages 122 are housed within the dovetail 90.

A cooling circuit 128 providing a flow of cooling fluid C through the airfoil 92 can include one or more cooling passages 130 are formed in the airfoil 92 extending in the substantially span-wise direction. 'Substantially' as used herein in combination with a directional reference, such as span-wise, chord-wise, radially, or axially, for example, can include parallel to that direction or slightly varying therefrom, such as by up to about five degrees. The cooling passages 130 fluidly couple with the passage outlets 124 and can be complementary to the passage outlets 124. One or more cooling holes 132, such as film holes or exhaust holes can be formed in the outer wall 98 having an inlet 134 at the cooling passage 130 and an outlet 136 at the outer wall 98. It should be appreciated that while the engine component is illustrated as a turbine blade 68, the engine component can be any suitable component utilizing film holes exhausting a fluid from an interior passage such as a cooling passage.

Figure 3:
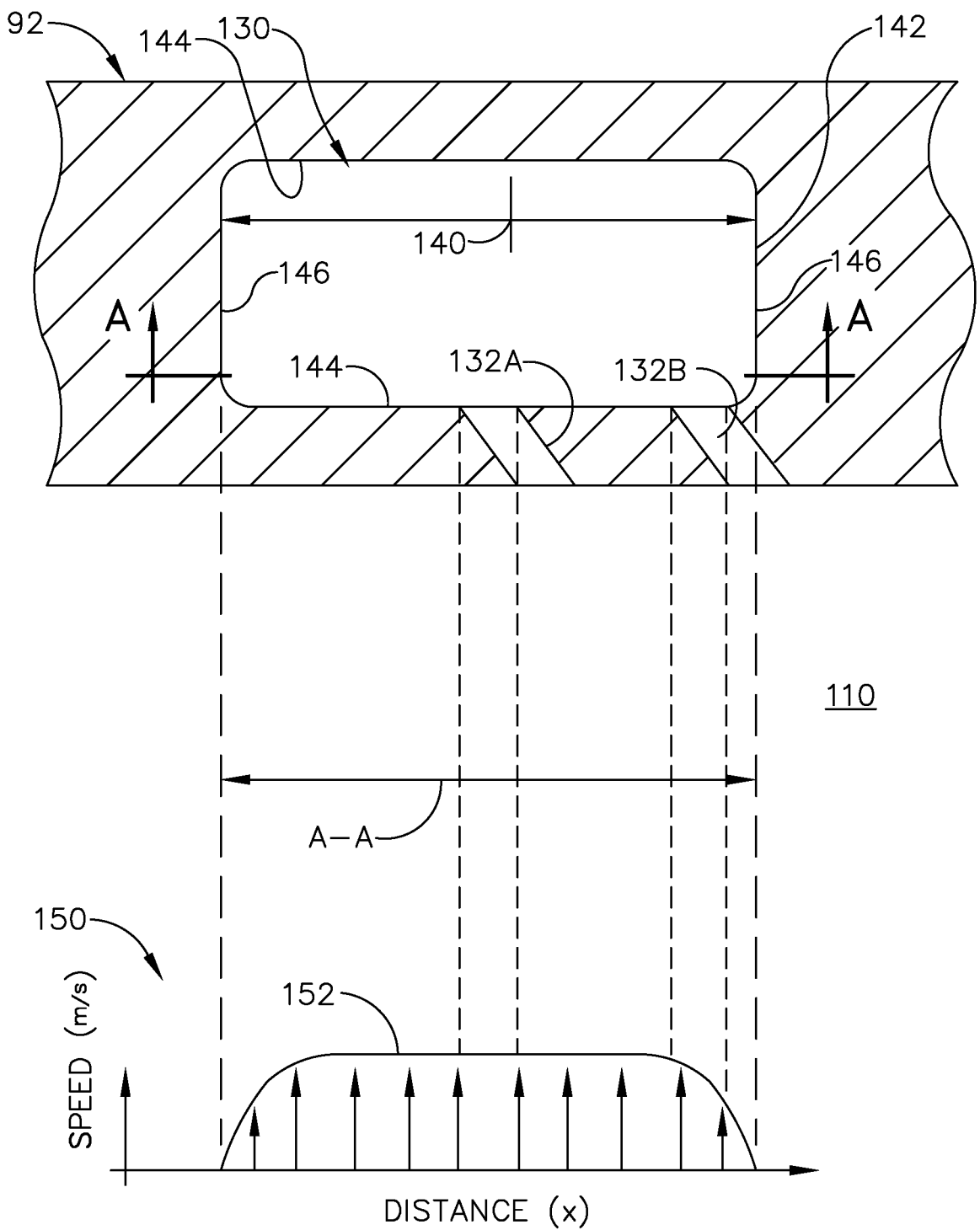
FIG. 3 is a schematic section view a cooling passage, and includes a connected plot illustrating flow speed through the cooling passage taken along section A-A.

Referring to FIG. 3, one cooling passage 130 can be formed having a rounded-rectangular shape and can have two sidewalls 144 and two end walls 146. Two exemplary cooling holes 132 couple the cooling passage 130 to the exterior 110 of the airfoil 92 as a first cooling hole 132A and a second cooling hole 132B. It should be appreciated that the cooling holes 132A, 132B as illustrated are by way of example only, and the position of such should not be limiting on the airfoil or cooling passages as described herein. The first cooling hole 132A is provided in one sidewall 144 at a chord-wise center 140 of the cooling passage 130 and the second cooling hole 132B is provided in one sidewall 144 at an aft, chord-wise end 142 of the cooling passage 130.

The cooling holes 132 can define a cooling hole speed vector in the substantially chord-wise direction for the flow of fluid passing through the cooling holes 132. A flow of fluid passing through the cooling passage 130 can define a passage speed vector that is substantially perpendicular to the cooling hole speed vector.

A plot 150 with a curve 152 represents local speed in meters per second (m/s) plotted against chord-wise distance (x) taken across section A-A of the cooling passage 130. It should be appreciated that speed as used herein can be interchangeable with velocity or any other rate of distance over time, with or without magnitude or directionality. The curve 152 is representative of an airflow speed passing through the cooling passage 130 in a direction extending into, or out of the page as shown in FIG. 3, with exemplary axes representing a 1:1 ratio of chord-wise distance (x) in the airfoil 92 and the plot 150. The local speed travelling through the cooling passage 130 passing into or out of the page of FIG. 3 travels in a path that is substantially orthogonal to the cooling holes 132. The curve 152 illustrates that the speed is at a maximum near the chord-wise center 140 of the cooling passage 130. The speed is at a minimum at the end walls 146 along the sidewalls 144, and at the chord-wise end 142 of the cooling passage 130. The lesser local speed at the aft, chord-wise end 142 as compared to the chord-wise center 140 is resultant of the local junction of the sidewall 144 and the end wall 146 at the aft end 142. At such as junction, the second cooling hole 132B experiences a lesser flow speed passing through the cooling passage 130 than that of the first cooling hole 132A.

When providing a flow of fluid at a constant flow rate and pressure to the cooling passage 130, the flow of fluid F through the cooling holes 132 can be substantially constant, regardless of position. At such a constant rate through the cooling holes 132, a ratio of the local speed through the cooling passage 130 adjacent the cooling holes 132, to the local speed through the cooling holes 132 can be defined. Positioning one of the cooling holes 132 at the aft, chord-wise end 142, such as that of the second cooling hole 132B, can provide for a decreased ratio of local speed through the cooling passage 130 adjacent the cooling holes to the speed though the cooling hole 132B, as defined by the decreased local speed through the cooling passage 130, represented in the plot 150. Such a decreased ratio can be less than 50%, or 0.50, measured as the local speed through the cooling passage 130 adjacent the cooling holes 132, divided by the local speed through the cooling hole 132B. Therefore, positioning one of the cooling holes 132 in the position of the second cooling hole 132B, as opposed to the position of the first cooling hole 132A, results in a lesser ratio of speed through the cooling passage 130 to the speed through the cooling hole 132. Alternatively, the speed of a flow passing through the cooling passage 130 and the cooling holes 132 can be represented as a Mach number. A ratio of the Mach number of cooling passage 130 to the cooling hole 132 can be 0.50 or less. In one non-limiting example, the Mach number of the flow passing through the cooling passage 130 can be less than 0.25.

Minimizing the ratio of speed of the flow through the cooling passage 130 to the speed of the flow through the cooling hole 132 minimizes the negative effects of a cross-flow across the inlet 134 of the cooling hole 132. A cross-flow can be a flow travelling across an inlet of a cooling hole substantially orthogonal to a centerline of a cooling hole, such that the flow cuts across the inlet as opposed to passing or turning into the cooling hole at the inlet. Cross-flow can generate flow separation, and turbulent or inconsistent flow through the cooling hole, negatively impacting cooling hole efficiency and effectiveness, as well as increasing the incidence of dust collection. Minimizing the cross-flow across the inlet 134 of the cooling hole 132 minimizes flow separation or turbulence of a flow entering the cooling hole 132, which improves cooling efficiency and effectiveness exhausted from the film hole 132. Therefore, it is advantages to position a cooling hole such as that of the second cooling hole 132B, where local velocities through the cooling passage 130 are minimized, or where the local ratio of speed through the cooling passage 130 to speed through the cooling hole is less than 0.50.

Additionally, it is contemplated that the cooling hole 132 is not positioned orthogonal to the cross-flow defined through the cooling passage 130. As such, the cooling hole 132 can be angled complementary to the flow direction through the cooling passage 130. Angled complementary as used herein can mean that a component of the flow vector defined through the cooling hole is in the same direction as the cooling passage 130, but somewhat offset, such as by an angle less than 90 degrees from orthogonal. As such, the angle defined between a local flow streamline between the cooling passage 130 and the cooling hole 132 can be between 91 degrees and 179 degrees.

Figure 4:
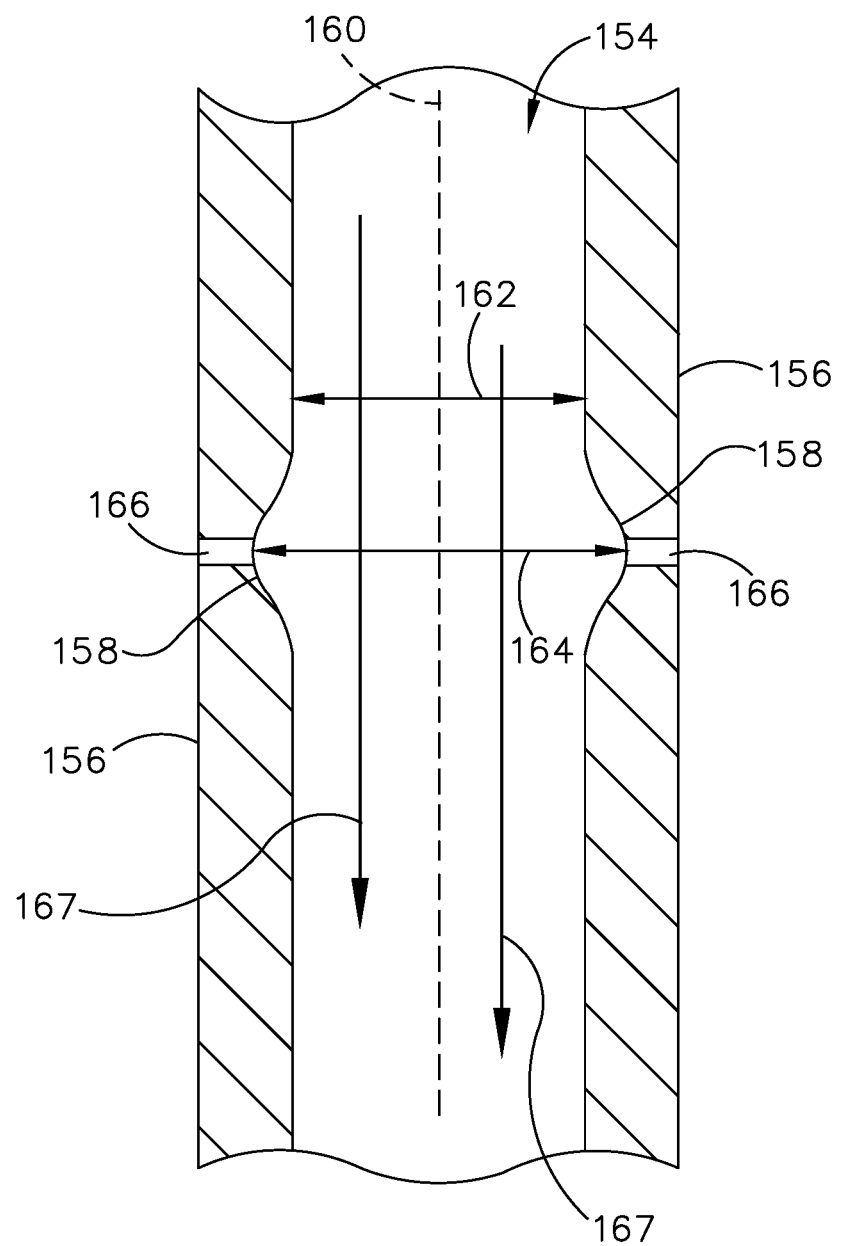
FIG. 4 is section view of another exemplary cooling passage having a set of recesses formed in sidewalls of the cooling passage.

Referring now to FIG. 4, another exemplary cooling passage 154 is defined between two opposing sidewalls 156, which can be outer walls of an airfoil or similar engine component, for example. A recess 158 can be formed in at least one of the sidewalls 156 with the exemplary cooling passage 154 having two recesses 158 aligned along the opposing sidewalls 156. A passage centerline 160 can be defined along the longitudinal length of the cooling passage 154 spaced between the sidewalls 156. A cross-sectional area 162 can be measured between the sidewalls 156 in a direction orthogonal to the passage centerline 160. The recesses 158 define an increased cross-sectional area portion 164 having a greater cross-sectional area as compared to the cross-sectional area 162 of the cooling passage 154 without the recesses 158. One or more exhaust holes 166 can be positioned at the recesses 158 forming the increased cross-sectional area portion 164.

A flow 167 can pass through the cooling passage 154 forming a cross-flow at the cooling holes 166. The cross-flow at the cooling holes 166 can be minimized by increased cross-sectional area portion 164. The increased cross-sectional area portion 164 of the cooling passage 154 at the recesses 158 can provide for a local decrease in the speed through the cooling passage 154. As such, maximizing the local cross-sectional area can provide for minimizing local speeds adjacent the cooling holes 166, which can provide for minimizing the ratio of the speed through the cooling passage 154 to the speed through the cooling hole 166, which can reduce the cross-flow across the cooling holes 166.

Figure 5:
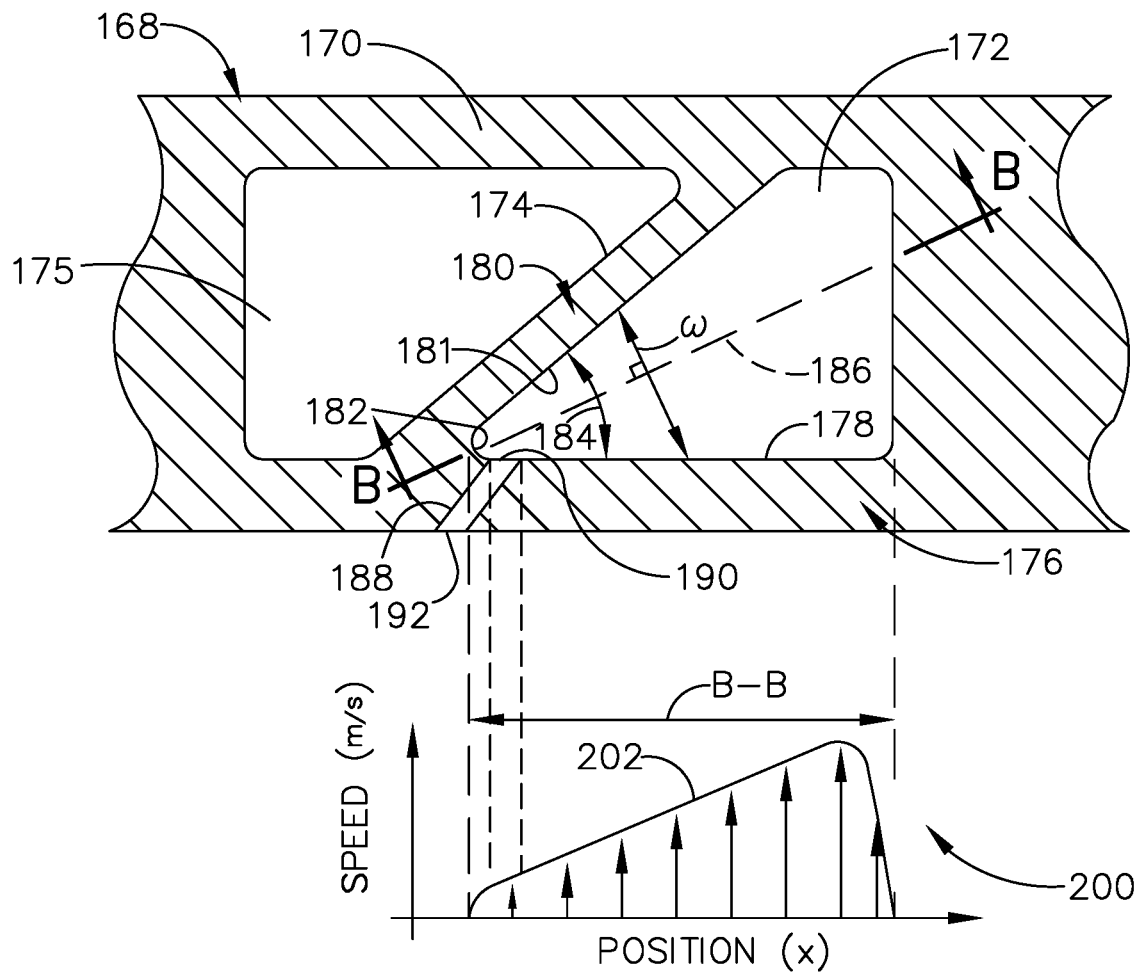
FIG. 5 is a schematic view of another, alternative exemplary cooling passage including a plot illustrating a flow speed through the cooling passage taken along section B-B.

Referring now to FIG. 5, an exemplary component 168, such as an airfoil, can include an outer wall 170 surrounding an alternative cooling passage 172 having a rounded-triangular, cross-sectional shape. The cooling passage 172 can be partially defined by an interior wall 174, such as a rib or other suitable structural element, separating the cooling passage 172 from an adjacent cooling passage 175. The outer wall 170 can include a first wall 176 having a first surface 178 facing the cooling passage 172 and the interior wall 174 can define a second wall 180 having a second surface 181 facing the cooling passage 172. While the first wall 176 is an outer wall 170 and the second wall 180 is an interior wall 174, it should be appreciated that any two walls defining the cooling passage 172 can be the first and second walls 176, 180. The first and second walls 176, 180 can intersect to define a junction 182. The junction 182 can be rounded or have a fillet, for example, or can be a corner between the two walls 176, 180. The junction 182 can define an angle 184 between the first and second walls 176, 180. In one non-limiting example, the angle 184 can be less than forty-five degrees, while any angle less than ninety degrees is contemplated.

The first and second walls 176, 180 can be spaced from one another by a wall spacing or cross-sectional distance w. The cross-sectional distance w can be variable, depending on the position along either the first or the second walls 176, 180 and the angle 184. A mean line 186 can be defined between the first and second walls 176, 180, as the center, equally spaced between the first and second walls 176, 180. The cross-sectional distance w can be defined in a direction perpendicular to the mean line 186.

A cooling hole 188 is positioned near the junction 182, or can alternatively be positioned at the junction 182. The cooling hole 188 has an inlet 190 near the junction 182 and an outlet 192 on the outer wall 170. In an alternative example, the inlet 190 can be at the junction 182.

A plot 200 with a curve 202 represents local speed in meters per second (m/s), taken across section B-B, for a flow of fluid passing through the cooling passage 172. Section B-B can be taken along the mean line 186 between the first and second walls 176, 180. As represented in the plot 200, a greater the cross-sectional distance co between the first and second walls 176, 180 directly relates to a greater local speed. Therefore, local velocities near the junction 182 are less than local velocities further from the junction 182, as the cross-sectional distance co increases extending from the junction 182.

As represented by the curve 202, positioning the inlet 190 of the cooling hole 188 at or near the corner or junction 182 provides for minimized local velocities of a flow passing through the cooling passage 172 adjacent to and orthogonal to the inlet 190. The minimized local speed at the inlet 190 minimizes the cross-flow across the cooling hole 188. Minimizing the speed through the cooling passage 172 further minimizes the ratio of speed of an airflow through the cooling passage 172 adjacent the cooling hole 188, to the speed of an airflow through the cooling hole 188. The minimized ratio can be less than 50%, or less than 0.50 when taken as dividing the local speed through the passage 172 at the inlet 190 by the speed of an airflow passing through the cooling hole 188. Minimizing the ratio reduces cross-flow across the cooling hole 188, which improves cooling hole efficiency and cooling effectiveness.

While such geometry is illustrated as a rounded-triangular shape in FIG. 5, it should be understood that any geometry having a minimized or decreased local wall spacing (w) can be suitable to reduce a ratio of speed through the cooling passage to the speed through the cooling hole to less than 50% or 0.50, which reduces the cross-flow over the cooling hole inlet.

Figure 6:
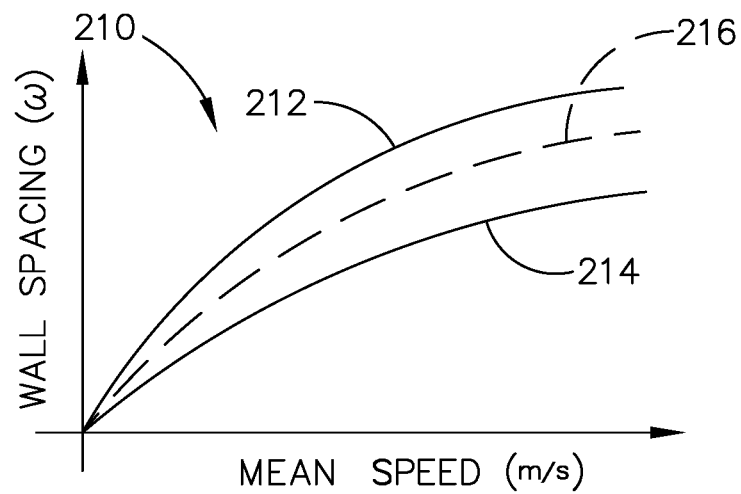
FIG. 6 is a plot illustrating mean speed against wall spacing.

Referring now to FIG. 6, another plot 210 represents mean speed (m/s) against wall spacing ($\omega$). A first curve 212 and a second curve 214 represent a range of speed based upon wall spacing ($\omega$), and includes a mean line 216 between the two. It should be understood that as the wall spacing ($\omega$) increases, the mean speed increases. As such, placing cooling holes, or inlets thereof, at areas having lesser wall spacing ($\omega$) provide for lesser local speeds, which can provide for decreased cross-flow at the cooling holes, providing for improved cooling hole efficiency. As such, cooling passage geometry can be formed having portions or areas having smaller local wall spacing to decrease local speeds, which can improve cooling hole function and efficiency by reducing the negative impact of cross-flow over the cooling hole inlets. The range between the first and second curves 212, 214 can be representative of other factors that can influence local speed, such as local features of the cooling passage such as a turbulating element, or a local increase or decrease in cross-sectional area of the cooling passage.

Figure 7:
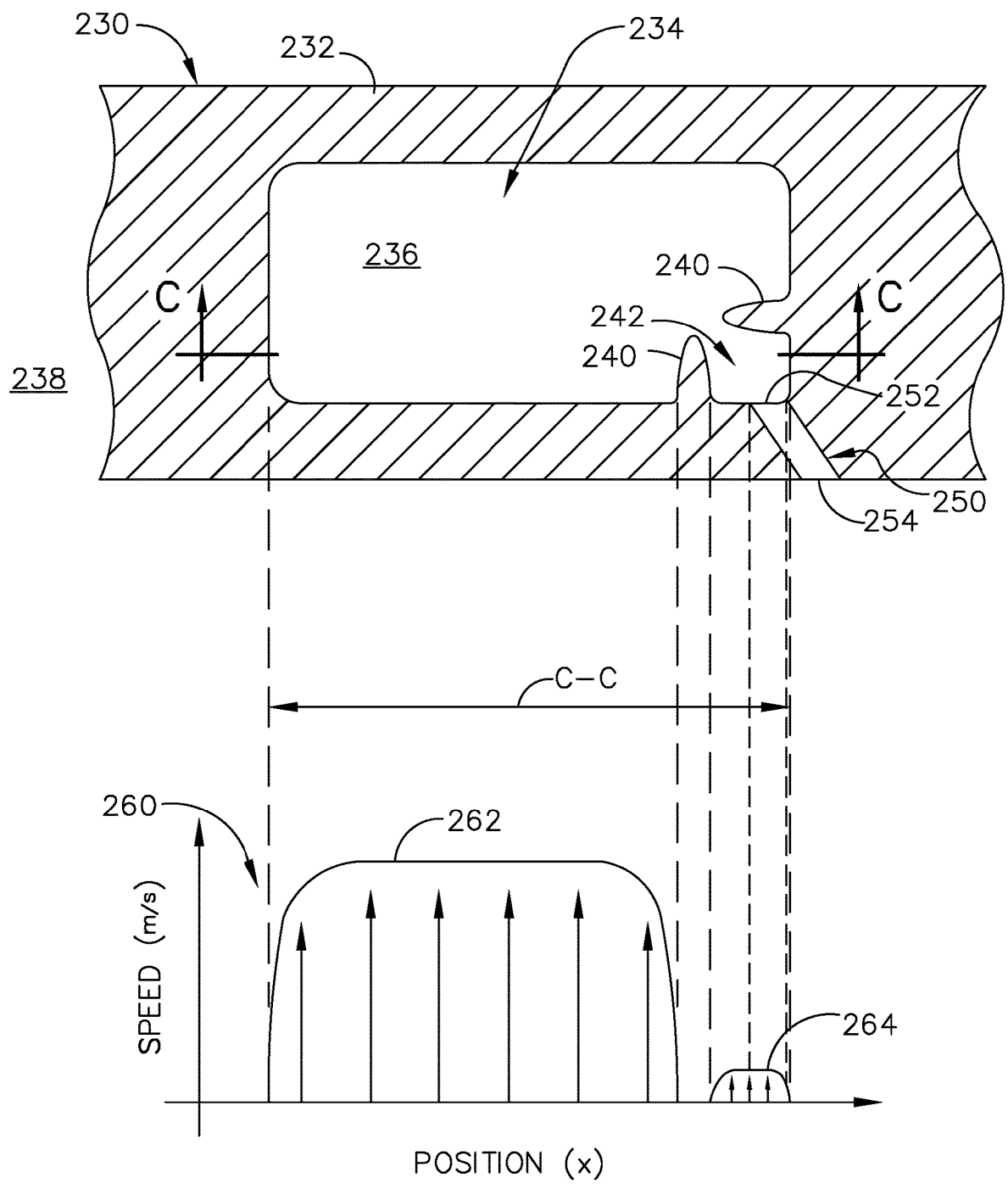
FIG. 7 is schematic view of yet another alternative, exemplary cooling passage having a sub-cooling passage formed by protrusions extending into the cooling passage and including a plot illustrating a flow speed through the cooling passage taken along section C-C.

Referring now to FIG. 7, another exemplary engine component 230, such as an airfoil, vane, shroud, or combustion liner in non-limiting examples, includes an outer wall 232 defining a cooling passage 234. The outer wall 232 separates an interior 236 from an exterior 238 of the engine component 230.

One or more protrusions 240, illustrated as two protrusions 240, can extend from the outer wall 232 into the cooling passage 234. A sub-cooling passage 242 can be defined and partially enclosed by the protrusions 240 and fluidly coupled to the cooling passage 234. The protrusions 240 can be discrete, such that sub-cooling passage 242 is only defined along a portion of the cooling passage 234, or can be elongated, extending along the cooling passage 234, such that the sub-cooling passage 242 can be formed as a slot or passage. In the case where the protrusions 240 are discrete, there can be multiple protrusions 240 arranged along the cooling passage 234. While the protrusions 240 are shown as having a generally linear orientation, it should be appreciated that the protrusions 240 can have any shape or geometry, and can at least partially form the sub-cooling passage 242.

A cooling hole 250 can be provided in the outer wall 232 and can include an inlet 252 at the interior 236 and an outlet 254 at the exterior 238. The inlet 252 can be provided at the sub-cooling passage 242 or adjacent the protrusion 240.

A plot 260 includes a first curve 262 and a second curve 264, representative of speeds (m/s) against position (x), where the position is taken along section C-C extending through one protrusion 240. The first curve 262 is representative of the local speed within the cooling passage 234 external of the sub-cooling passage 242. The second curve 264 is representative of the local speeds within the sub-cooling passage 242 as defined by the protrusions 240. As is appreciable in the plot 260, the local speeds in the sub-cooling passage 242 are less than that of the cooling passage 234 external of the sub-cooling passage. Therefore, positioning the inlet 252 of the cooling hole 250 at the sub-cooling passage 242 or adjacent the protrusions 240 can provide for decreased local speeds at the inlet 252, which can provide for a minimized ratio of speed through the sub-cooling passage 242 to speed through the cooling hole 250, which can be less than 50% or 0.50. The reduced speed through the sub-cooling passage 242 provides for minimized cross-flow over the inlet 252 of the cooling hole 250, which can provide for improved efficiency of the cooling hole 250 and improved cooling effectiveness.

Alternatively, the protrusions 240 need not define a sub-cooling passage 242, but can define a first wall and the wall from which the protrusion couples can be a second wall. The first wall defined by the protrusion 240 can provide for a locally reduced speed in a manner similar to the first and second walls 176, 180 as described in FIG. 5. As such, an inlet for a cooling hole can be placed adjacent the protrusion and still receive the benefit of the reduced local flow speed, without defining a sub-cooling passage, while balancing the needs to minimize material forming the cooling passage to reduce component weight.

A method of minimizing cross-flow across an inlet of a cooling hole exhausting a fluid from a cooling passage can include positioning the cooling hole to have a ratio of a flow speed through the cooling passage at the inlet to a flow speed through the cooling hole to be less than 0.50. Positioning can include positioning the cooling hole along the cooling passage having an increased local cross-sectional area of the cooling passage in order to minimize the flow speed through the cooling passage. At a constant flow rate to the cooling passage, shaping a cooling passage to have a greater cross-sectional area can reduce the speed of a flow passing through the cooling passage, which can provide for a lesser ratio of speed through the cooling passage to a speed through the cooling hole. Additionally, the cooling passage can be shaped to have increased cross-sectional area, such as that defined by the recesses 158 of FIG. 5, where the increased cross-sectional area has a greater cross-sectional area than adjacent portions of the cooling passage, where the increased cross-sectional area minimizes the local speed through the cooling passage. The inlet of the cooling hole can be provided at the increased cross-sectional area to provide for the decreased ratio of speed through the cooling passage to speed through the cooling hole.

The method can also include where shaping further comprises forming a first wall and a second wall joined at a junction, defining a decreasing cross-sectional distance for the cooling passage toward the junction. For example, as in FIG. 5, the first and second walls 176, 180 join at a junction and provide a decreasing cross-sectional distance (w) toward the junction. The method can further include positioning the inlet at a portion of the cooling passage having a minimal cross-sectional distance, or adjacent the junction, where local speeds through the cooling passage are decreased.

The method can further include angling the cooling hole relative to the flow direction through the cooling passage to increase the flow speed through the cooling passage. Angling the cooling hole to receive the flow along the flow direction provides for minimizing cross-flow and provides for increasing a flow speed through the cooling hole, which can minimize the ratio of speed through the cooling passage to speed through the cooling hole.

Shaping of the method can further include forming a protrusion extending from the cooling passage and positioning the inlet adjacent the protrusion. Flow speeds through the cooling passage adjacent the protrusion can be locally decreased. Positioning the inlet adjacent the protrusion can take advantage of the locally decreased flow speeds through the cooling passage, which can decrease the ratio of the speed through the cooling passage to the speed though the cooling hole.

Shaping can further include forming a sub-cooling passage within the cooling passage and positioning the inlet at the sub-cooling passage. The sub-cooling passage can have a decreased local flow speed, which can provide for the minimized ratio of flow speed through the sub-cooling passage to the flow speed through the cooling hole.

To the extent not already described, the different features and structures of the various embodiments can be used in combination as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

It should be appreciated that application of the disclosed design is not limited to turbine engines with fan and booster sections, but is applicable to turbojets and turbo engines as well. The elements and components as described herein can be made by additive manufacturing such as 3D printing, permitting complex geometry for reducing local flow speeds at cooling hole inlets to minimize the cross-flow.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
an outer wall having an outer surface and an inner surface bounding an interior, the outer wall defining a pressure side and a suction side extending axially between a leading edge and a trailing edge defining a chord-wise direction and extending radially between a root and a tip defining a span-wise direction;
an interior wall extending into the interior from the outer wall;
a cooling circuit at least partially defined by a cooling passage located in the interior, defining a flow direction, and having a passage cross-sectional area, with the cooling passage at least partially defined by the interior wall; and
at least one cooling hole extending through the outer wall having an inlet provided at the cooling passage and an outlet provided on the outer surface, with the inlet of the cooling hole positioned along the outer wall at the interior wall to maintain a ratio of a speed of a flow of fluid through the cooling passage to a speed of a flow of fluid through the cooling hole to be less than 0.50;
wherein the positioning of the at least one cooling hole at the interior wall results in a decreased local flow of the speed of the flow of fluid through the cooling passage, which results in the ratio to be less than 0.50.

2. The airfoil of claim 1 wherein the ratio of the speed of the flow of fluid through the cooling passage to the speed of the flow of fluid through the cooling hole is less than 0.25.

3. The airfoil of claim 1 wherein a ratio of a Mach number of the flow of fluid passing through the cooling passage to a Mach number of the flow of fluid passing through the cooling hole is less than 0.50.

4. The airfoil of claim 3 wherein the Mach number of the flow of fluid passing through the cooling passage is between 0.50 and 0.05.

5. The airfoil of claim 1 wherein the cooling passage further includes an increased cross-sectional area and the positioning of the cooling hole relative to the cooling passage is at the increased cross-sectional area.

6. The airfoil of claim 5 wherein the cooling passage further includes at least one recess at least partially defining the increased cross-sectional area.

7. The airfoil of claim 1 wherein the cooling hole is angled complementary to the flow direction through the cooling passage.

8. The airfoil of claim 1 wherein the cooling passage further includes an endwall and the cooling hole is positioned adjacent the endwall.

9. The airfoil of claim 8 wherein the cooling hole defines a cooling hole speed vector in the chord-wise direction for the flow of fluid passing through the cooling hole, being substantially perpendicular to a passage speed vector of the cooling fluid passing through the cooling passage.

10. A component for a turbine engine, the component comprising:
an outer wall having an outer surface and an inner surface bounding an interior space;
an interior wall extending into the interior from the inner surface of the outer wall;
a cooling passage located in the interior, at least partially defined by the interior wall, and adapted to provide a flow of fluid along a flow direction; and
at least one cooling hole extending through the outer wall having an inlet provided adjacent the interior wall and an outlet provided on the outer surface;
wherein the inlet of the at least one cooling hole is positioned adjacent to, but spaced from the interior wall to maintain a ratio of a speed of the flow of fluid through the cooling passage to a speed of the flow of fluid through the cooling hole to be less than 0.50; and
wherein positioning of the inlet of the at least one cooling hole at the interior wall results in a decreased local flow of the speed of the flow of fluid through the cooling passage, which results in the ratio to be less than 0.50.

11. The component of claim 10 further comprising a corner defined at a junction between the outer wall and the interior wall, and the inlet is positioned at the corner.

12. The component of claim 10 wherein the interior wall disposed at an angle relative to the outer wall.

13. The component of claim 12 wherein the angle is less than 90 degrees.

14. The component of claim 10 further comprising a second wall shaped to define a sub-cooling passage at the interior wall fluidly coupled to the cooling passage.

15. The component of claim 14 wherein the inlet is positioned at the sub-cooling passage.

16. The component of claim 10 further comprising a protrusion extending from the interior wall minimizing a cross-sectional distance defined between the interior wall and the outer wall.

17. The component of claim 16 wherein the inlet is adjacent to the protrusion.

18. A method of minimizing cross-flow across an inlet of a cooling hole exhausting a fluid from a cooling passage, the method comprising:
positioning the cooling hole in an outer wall adjacent but spaced from an interior wall wherein a ratio of a flow speed through the cooling passage at the inlet to a flow speed through the cooling hole is less than 0.50; and
wherein the positioning of the cooling hole at the interior wall results in a decreased local flow speed of the flow speed through the cooling passage, which results in the ratio to be less than 0.50.

19. The method of claim 18 further comprises shaping the cooling passage to maximize a cross-sectional area of the cooling passage, wherein maximizing the cross-sectional area of the cooling passage minimizes the flow speed through the cooling passage.

20. The method of claim 19 wherein maximizing the cross-sectional area of the cooling passage includes further shaping an increased cross-sectional area portion of the cooling passage having a greater cross-sectional area than adjacent portions of the cooling passage.

21. The method of claim 18 further comprising forming a first wall and a second wall joined at a junction, and defining a decreasing cross-sectional distance for the cooling passage toward the junction.

22. The method of claim 21 further comprising positioning the inlet for the cooling hole at a portion of the cooling passage having a minimal cross-sectional distance between the first wall and the second wall, or at the junction between the first wall and the second wall.

23. The method of claim 18 further comprising angling the cooling hole relative to a flow direction of the fluid through the cooling passage to increase the flow speed through the cooling hole.

24. The method of claim 18 further comprising forming a protrusion extending into the cooling passage and positioning the inlet adjacent the protrusion.

25. The method of claim 18 further comprising forming a sub-cooling passage within the cooling passage and positioning the inlet at the sub-cooling passage.

* * * * *